Figure 1:
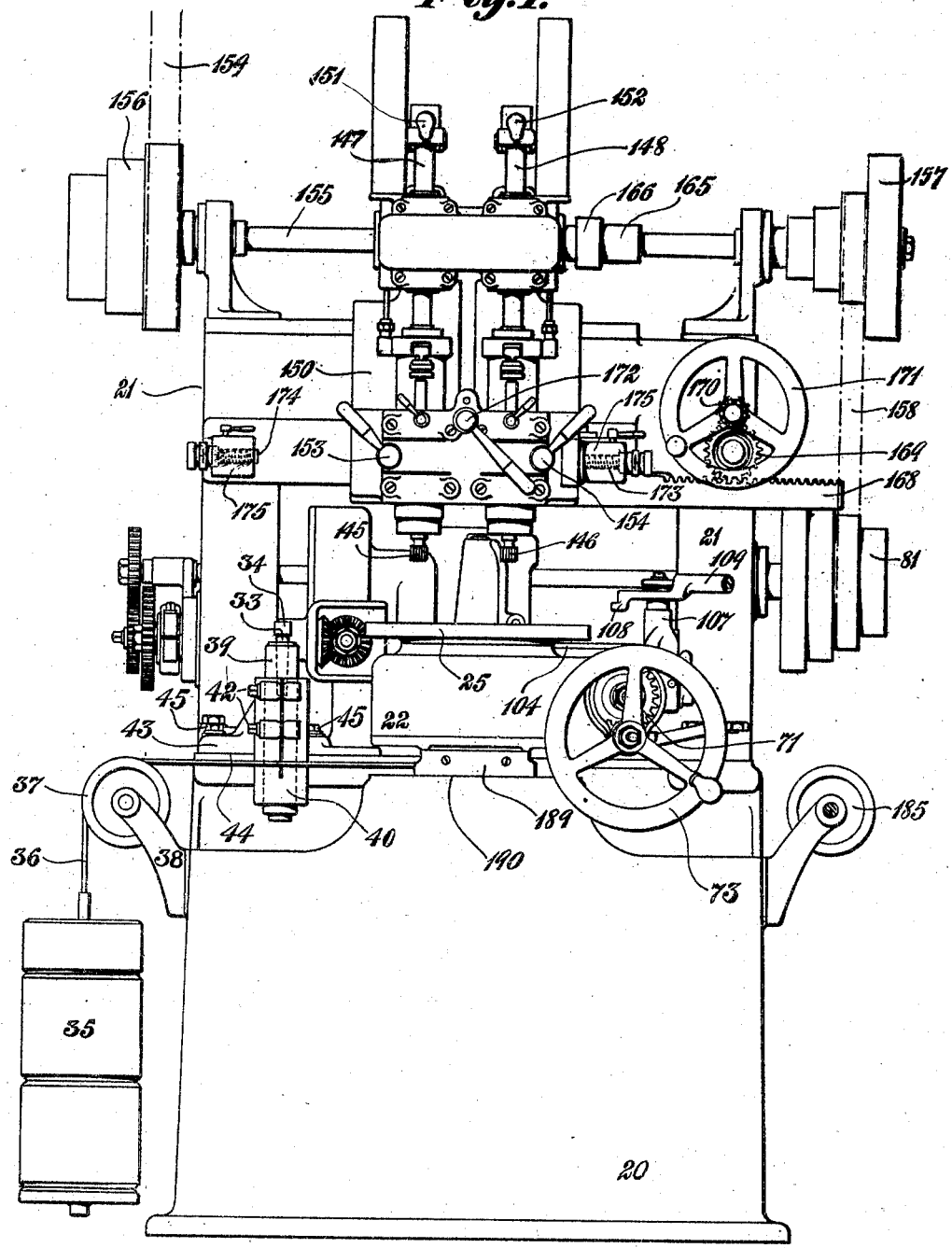

B. M. W. HANSON & C. L. GROHMANN.
PROFILING MACHINE.
APPLICATION FILED AUG. 8, 1911.

1,084,625.

Patented Jan. 20, 1914.
9 SHEETS—SHEET 1.

Witnesses:
E. S. Anderson
A. C. Anderson

Inventors:
B. M. W. Hanson
C. L. Grohmann
By their Attorneys,
Sutherland & Anderson

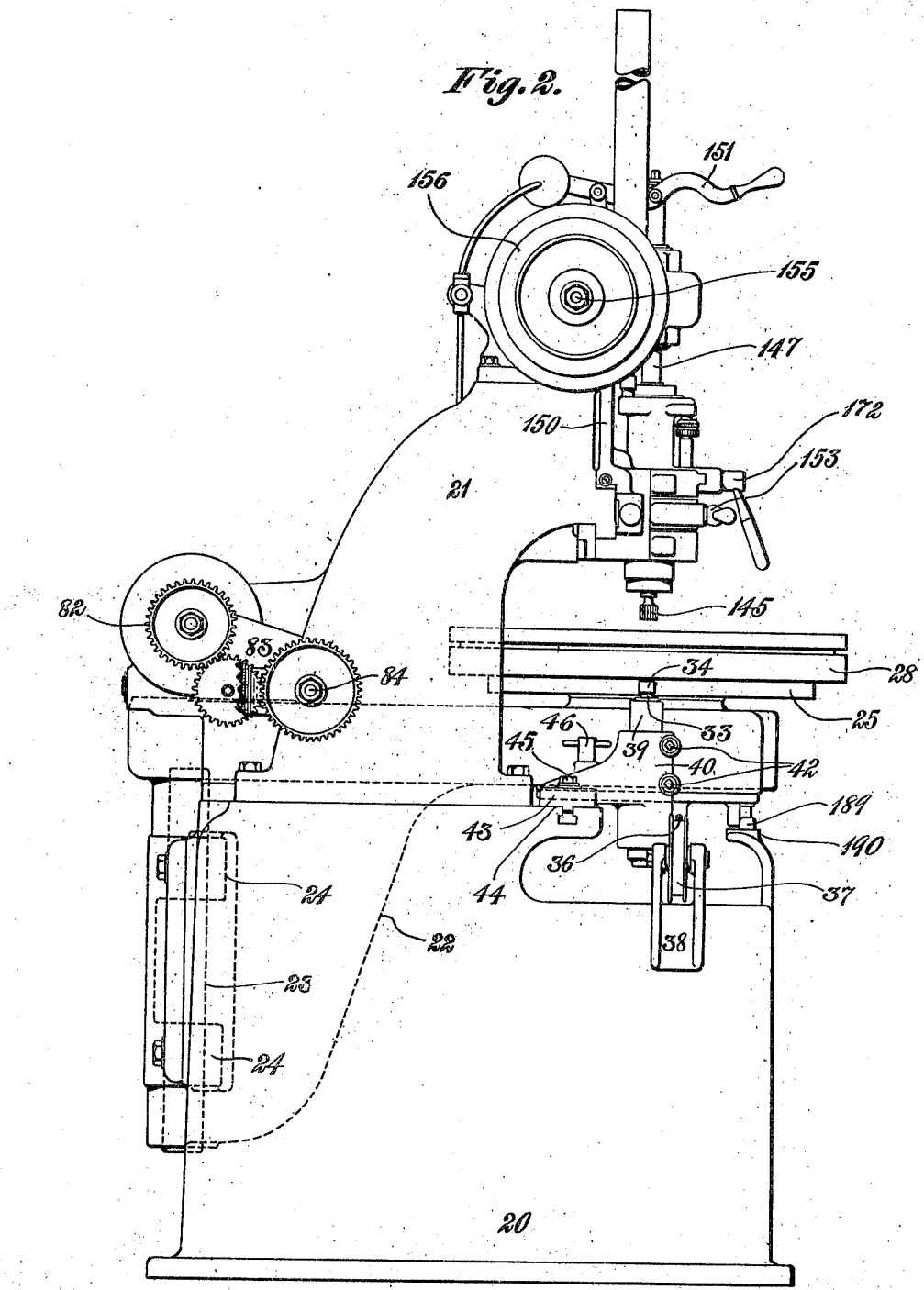

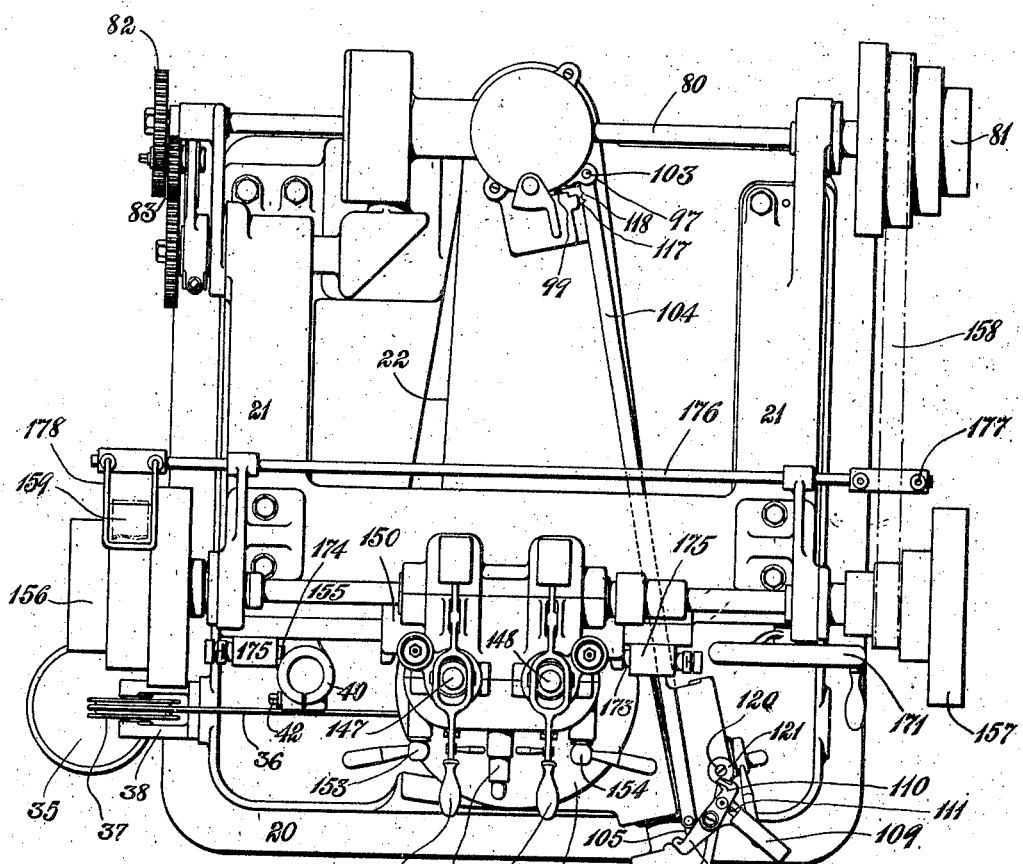
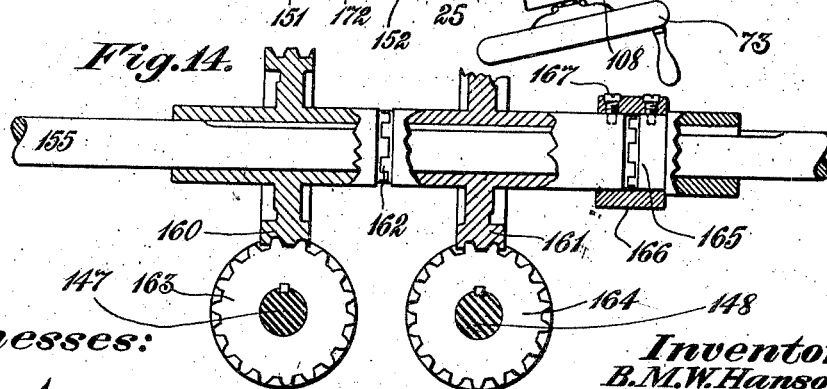

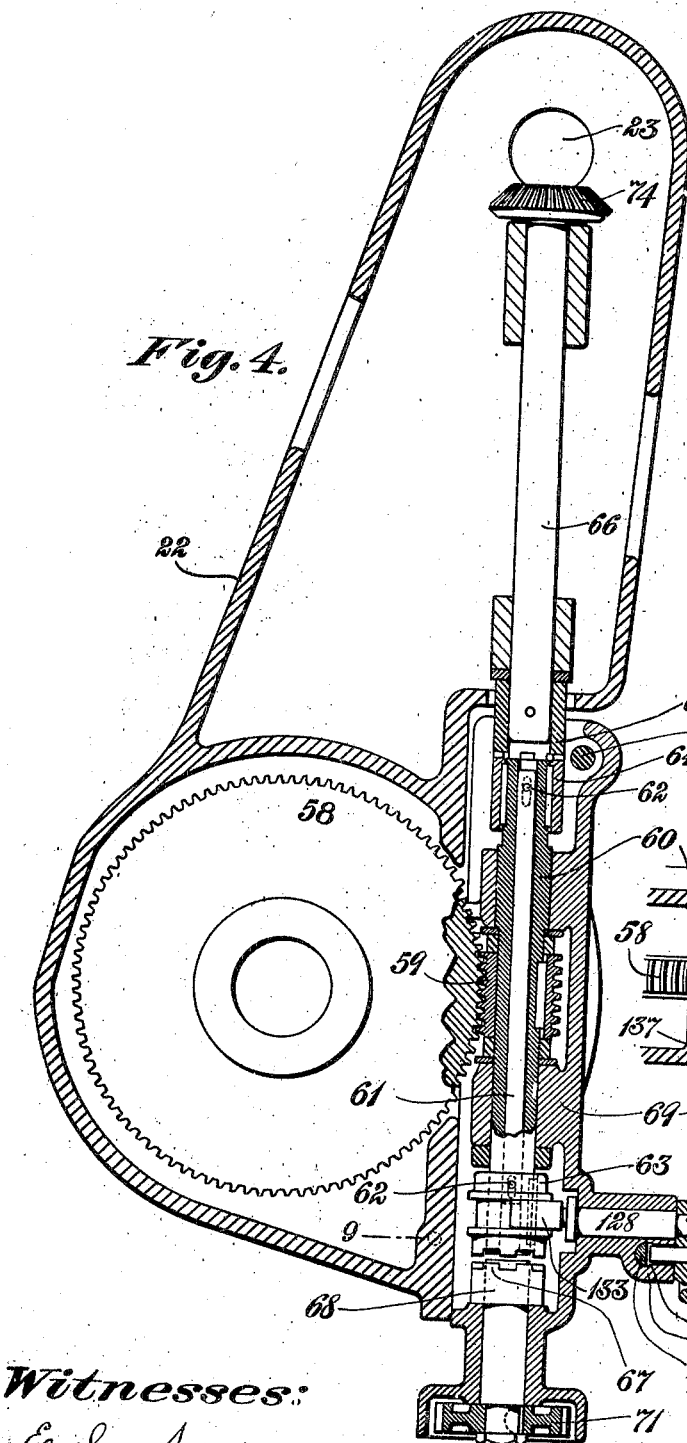
B. M. W. HANSON & C. L. GROHMANN.
PROFILING MACHINE.
APPLICATION FILED AUG. 8, 1911.
1,084,625.
Patented Jan. 20, 1914.
9 SHEETS—SHEET 4.
Witnesses:
E. S. Anderson
A. C. Anderson
Inventors:
B. M. W. Hanson
C. L. Grohmann
By their Attorneys,
Sutherland & Anderson B. M. W. HANSON & C. L. GROHMANN.
PROFILING MACHINE.
APPLICATION FILED AUG. 8, 1911.
1,084,625.
Patented Jan. 20, 1914.
9 SHEETS—SHEET 5.
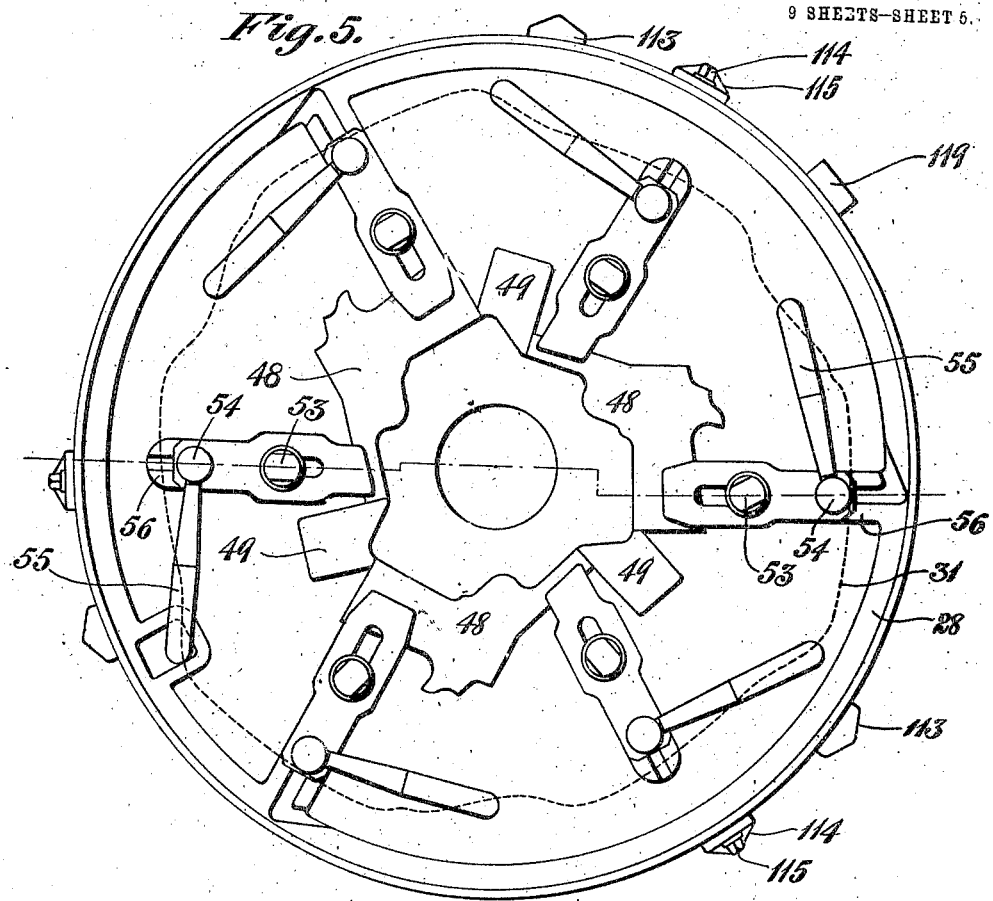
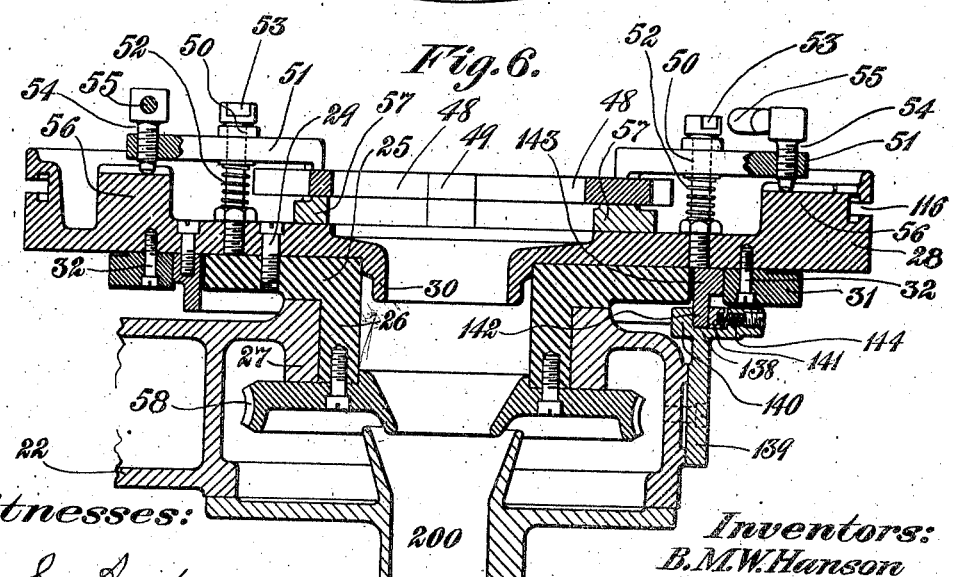
Witnesses:
E. S. Anderson
A. C. Anderson
Inventors:
B. M. W. Hanson
C. L. Grohmann
By their Attorneys,
Sutherland Anderson B. M. V. HANSON & C. L. GROHMANN.
PROFILING MACHINE.
APPLICATION FILED AUG. 8, 1911.

1,084,625.

Patented Jan. 20, 1914.
9 SHEETS—SHEET 6.

Witnesses:

Inventors:
B. M. W. Hanson
C. L. Grohmann
By their Attorneys,

B. M. W. HANSON & C. L. GROHMANN.
PROFILING MACHINE.
APPLICATION FILED AUG. 8, 1911.
1,084,625.
Patented Jan. 20, 1914.
9 SHEETS—SHEET 7.
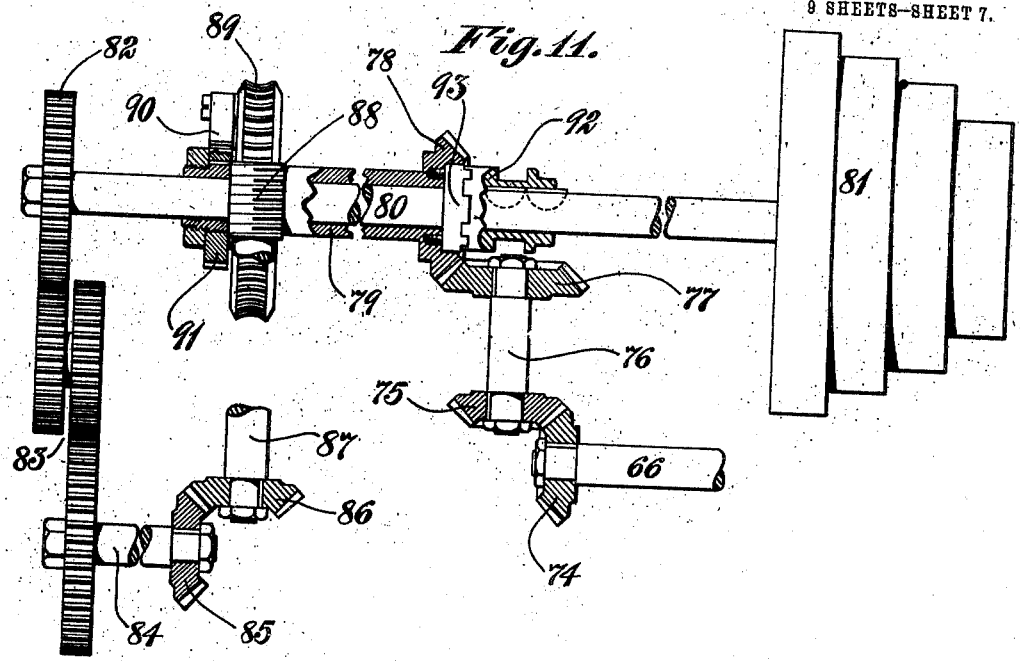
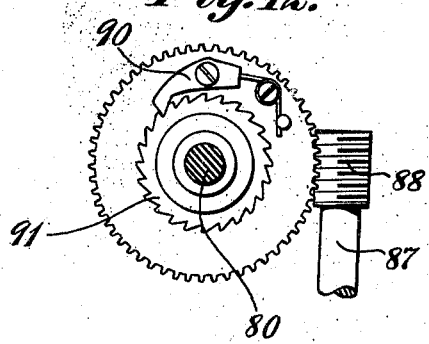
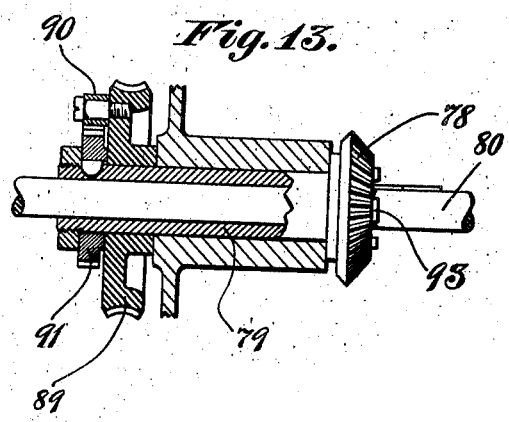
Witnesses:
Inventors:
B. M. W. Hanson
C. L. Grohmann
By their Attorneys,

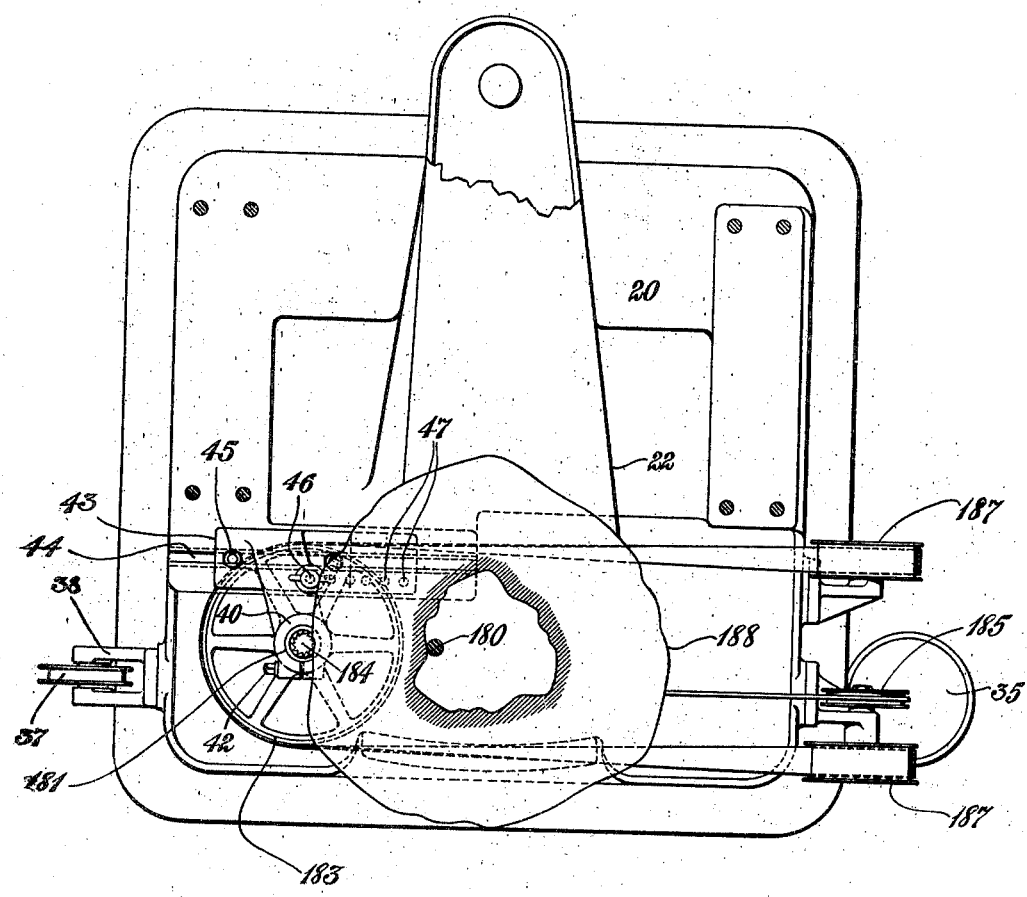

B. M. W. HANSON & C. L. GROHMANN.
PROFILING MACHINE.
APPLICATION FILED AUG. 8, 1911.

1,084,625.

Patented Jan. 20, 1914.
9 SHEETS—SHEET 9.

Witnesses:
L. L. Markel
M. Bryce

Inventors:
B. M. W. Hanson
C. L. Grohmann
By their Attorneys,
Sutherland Anderson

UNITED STATES PATENT OFFICE.

BENGT M. W. HANSON AND CARL L. GROHMANN, OF HARTFORD, CONNECTICUT, ASSIGNORS TO PRATT & WHITNEY COMPANY, A CORPORATION OF NEW JERSEY.

PROFILING-MACHINE.

1,084,625.

Specification of Letters Patent.

Patented Jan. 20, 1914.

Application filed August 8, 1911. Serial No. 643,051.

*To all whom it may concern:*

Be it known that we, BENGT M. W. HANSON and CARL L. GROHMANN, citizens of the United States, residing at Hartford, in the county of Hartford and State of Connecticut, have invented certain new and useful Improvements in Profiling-Machines, of which the following is a specification.

This invention relates to profiling machines, the object of the invention being to provide an effective apparatus of this character by which the automatic shaping, through the agency of a suitable cutter or tool, of a practically endless variety of forms conforming in contour respectively with formers of varying shapes, can be secured with rapidity and accuracy.

In the drawings accompanying and forming part of the present specification we have shown in detail one convenient form of embodiment of the invention which to enable those skilled in the art to practice said invention, will be set forth fully in the following description, while the novelty of the invention will be included in the claims succeeding said description. From such statement it will be apparent that we do not restrict ourselves to the showing made by said drawings and description; we may depart therefrom in several respects within the scope of our invention included in said claims.

Figure 7:
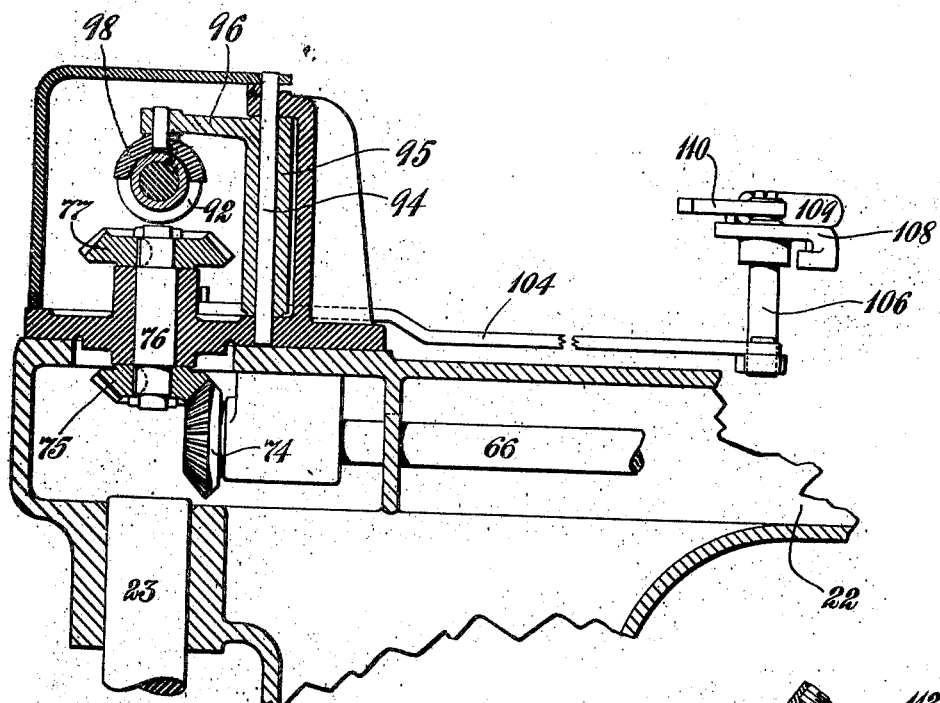
Figure 8:
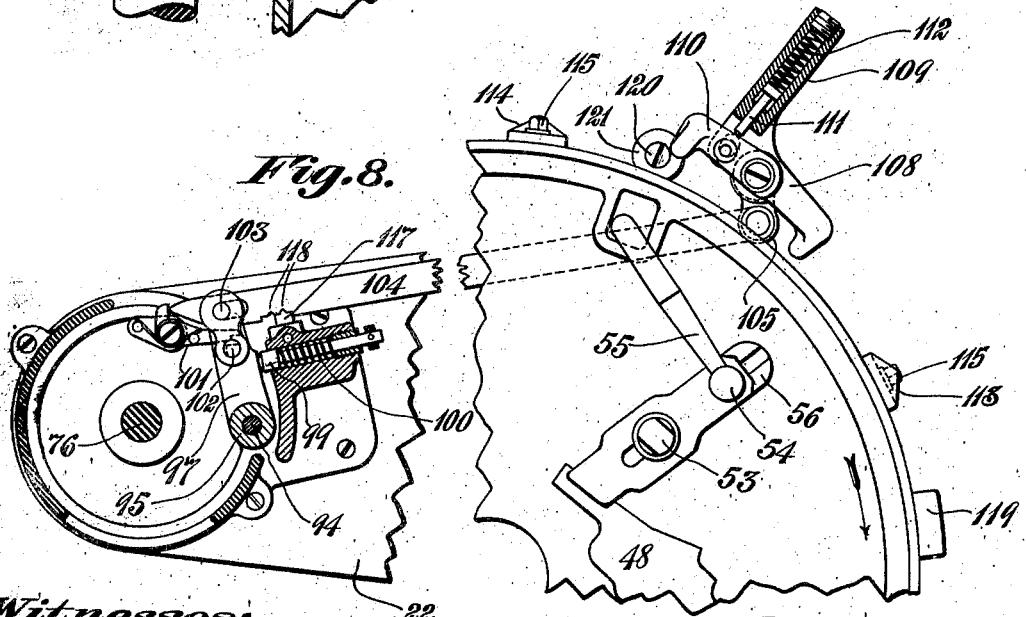
Figure 18:
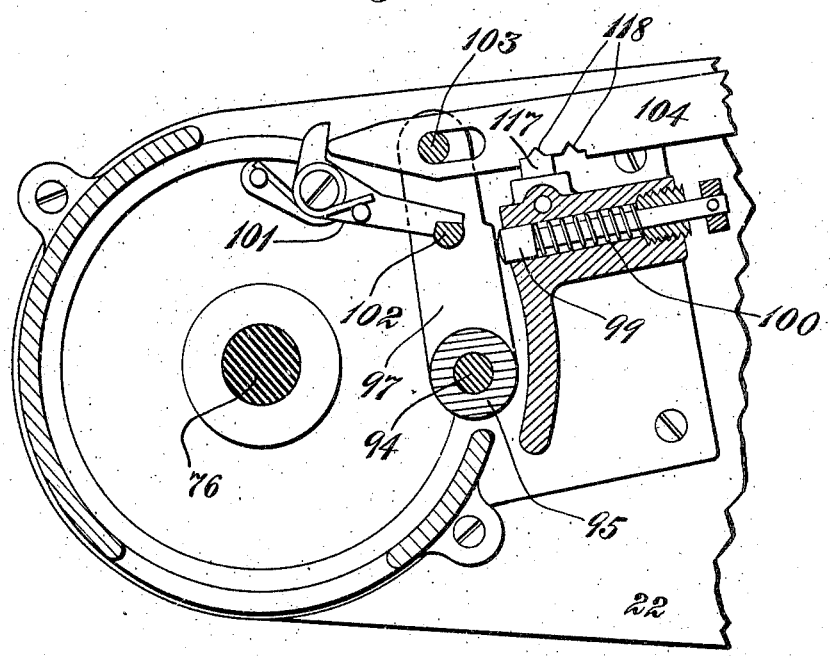
Figure 19:
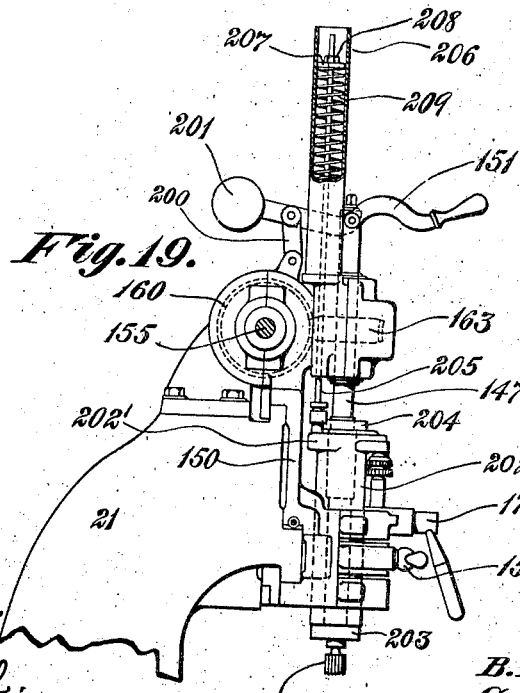

Referring to said drawings: Figure 1 is a front elevation of a profiling machine involving our invention. Fig. 2 is a side elevation of said machine as seen from the left in Fig. 1, the weight being omitted. Fig. 3 is a top plan view of said machine. Fig. 4 is a horizontal section of an oscillating arm and certain of the parts inclosed thereby. Fig. 5 is a top plan view of a fixture with its appurtenances. Fig. 6 is a vertical section of the parts shown in Fig. 5 with the outer end of the oscillating arm of the face plate. Fig. 7 is a vertical section of the inner portion of the oscillating arm. Fig. 8 is a plan view partly in section of a portion of the fixture and the speed controlling mechanism. Fig. 9 is a section on the line 9—9 of Fig. 4. Fig. 10 is a section on the line 10—10 of Fig. 9. Fig. 11 is a sectional view of the face plate driving mechanism. Fig. 12 is an elevation of certain members of the driving mechanism hereinafter more particularly described. Fig. 13 is a sectional view of the parts shown in Fig. 12. Fig. 14 is a sectional view of driving mechanism for the spindles. Fig. 15 is a plan view of the bed and the parts sustained thereby but with the column and its adjuncts omitted and is intended to show more particularly how the work can be utilized for profiling or forming the former or pattern. Fig. 16 is an elevation of the former pin shaft provided with a milling tool for profiling the former which with the belting is also illustrated in said figure. Fig. 17 is a detail view hereinafter more particularly described. Fig. 18 is a view of that fragment of Fig. 8 at the left and on a much larger scale. Fig. 19 is a side elevation partly in section of the upper part of the column and the slide mechanism thereon.

Like characters refer to like parts throughout the several figures.

The machine preferably involves in its organization a carrier mounted for back and forth movement and which may, but not necessarily, consist of an oscillatory or swinging arm, and a work carrying face plate or rotary table supported by said arm, and in conjunction with the said oscillatory member and rotary face plate we prefer to provide a former which is generally rigidly associated with the face plate, although in the present case it is not directly connected therewith. In connection with the said former is a relatively fixed former stud or pin, and in milling work the active face of the former is held solidly or substantially against said stud during the rotation of said face plate; for this purpose a weight or equivalent means may be provided. The consequence is that when the face plate or work carrying table is rotated and when a milling or cutting tool is brought into proper relation with the work, the tool will profile the work and will, relatively speaking, follow a path approximately like that of the former. As a matter of fact the working surface of the former is to all intents and purposes in the present case practically like that of the work, the only difference in the construction shown being that the contour of the former is somewhat exaggerated which is natural owing to the fact that it is of comparatively large size. The particular shape of the pattern or former, however, is not a matter of consequence. We prefer, although we do not restrict ourselves in this respect to swing the oscillatory member and to rotate the face plate about parallel vertical axes and to provide means for effectively disposing of the lubricant which is directed against the work during milling and also the chips which result as a consequence of the milling operation. We prefer also to provide a fixture removably connected with said face plate and to which the work is clamped, the construction being such that several pieces of work can be connected to the fixture at one time. As a matter of increasing the efficiency of the machine we prefer that when one piece of work is milled, to rapidly rotate the face plate or turn table so as to quickly bring a second piece of work in position to be profiled, and this we do by automatic quick-feed mechanism which is thrown into action at the proper time or times. We prefer also to provide this fixture with certain devices which practically form a permanent part thereof, the fixture with its attachments presenting a unit which can be mounted upon or dismounted from the machine, as such leaving nothing in the way of adjustment or such matters to a machinist.

The foregoing is a general description of some of the features of the organization shown in the drawings but to which we are not however limited except as required by the scope of the claims; we will hereinafter refer considerably in detail to these points and certain others.

The different parts of the machine may be supported by any desirable frame work; for this purpose we have shown the base or bed 20 and the standard or column 21 rising therefrom and bolted or otherwise suitably connected to the upper side of said base or bed. An oscillatory member such as meets our requirements, is that denoted in a general way by 22, the same being shown as consisting of a horizontally disposed hollow or chambered arm which rocks on the vertically disposed shaft 23 fixed in suitable bearings as 24 at the rear side of the bed 20. The hollow oscillatory member or arm 22, as will hereinafter appear, incloses some of the driving parts for the work carrying rotary face plate or turn table 25. (See Fig. 4.) The face plate or turn table 25 is of practically circular form, and it is shown having a substantially central opening and a depending hollow pivot 26 (Fig. 6) rotative in an interior hub 27 at the outer end of the oscillatory arm 22 which, as will be understood, is supported by, and swings in contact with, or against the upper side of the bed 20. As will hereinafter appear this face plate or turn table 25 is power operated, being continuously rotative during the profiling operation, although at intervals it is given accelerated movements. Although the face plate or turn table 25 constitutes a work carrier, the work is not directly connected therewith being clamped or otherwise suitably connected to what we denote as a "fixture" 28. The fixture 28 is removably supported by the face plate 25, and screws as 29 may be provided for this purpose. The fixture is shown in the form of a practically circular plate of larger diameter than the face plate and as having at its center an opening and as also provided with a depending spout 30 in register with said opening and which extends into the central opening of the face plate 25 and also into the hollow pivot or journal portion 26. Through this spout 30 and hollow pivot 26 the lubricant and chips can pass and will be disposed of as will hereinafter appear.

Preferably, although not necessarily the former is connected with the fixture or plate 28. Said former is shown as consisting of a band or annulus 31 surrounding and practically in the plane of the face plate 25, being fastened to the under side of the fixture or plate 28 by means of screws 32 or otherwise all as shown in Fig. 6. In the present case the periphery of the former or pattern 31 constitutes the active part thereof, although this is neither material or essential. We might also indicate at this point that the former as shown is of such nature as to effect the profiling of three pieces of work; neither is this essential. In connection with the former 31 we prefer to provide what is known as a "former pin" and such a one as satisfactorily answers our purpose is that denoted by 33, it being shown in Figs. 1 and 2 for example and as having at its active portion an anti-friction roller 34 which directly engages the working surface of the former 31 as shown in Fig. 2. This former pin or stud 33 is normally stationary and its mounting as shown will be hereinafter described.

As already intimated the former 31 is held solidly against the former pin or stud 33 during the profiling operation and to accomplish this function various means may be provided, although we have illustrated for this purpose the weight 35 connected to the outer end of the cord or chain 36 passing around an anti-friction roller or sheave 37 supported by a bracket 38 on one side of the bed 20, the inner end of the said cord or chain 36 being united with the oscillatory arm 22 as shown best in Fig. 1. The stud or former 33 is provided with a shank to fit a suitable socket in the bushing 39, which removably fits the bearing sleeve 40 as shown best in Figs. 1 and 2, said sleeve 40 being split or divided at its upper portion and carrying the clamping screws 42 which can be set up to cause the said split bearing sleeve 40 to tightly embrace the bushing 39. By loosening the said screws 42 the grip of the bearing sleeve 40 upon the bushing 39 can be relieved so that when necessary as will hereinafter appear said former pin may be removed. The bearing sleeve 40 is preferably rigid with the slide 43 (see Figs. 2 and 15), said slide 43 being adjustably supported by a way as 44 on the bed 20 and being held in its adjusted position by means of clamping screws 45. From this description it will be apparent that the slide 43 is adjustable transversely of the base or bed 20 and by reason of this mounting the former stud or pin 33 can be adjusted to conform to the size of the particular former in use. The slide 43 in addition to the clamping bolts 45 is equipped with a pin 46 adapted to interchangeably fit the perforations 47 in or upon the way 44, said perforations being shown in Fig. 15 as on a straight line transversely of the machine and the pin or bolt 46 occupying the extreme outermost perforation. By lifting the said pin 46 out of said outermost perforation, the slide 43 can be moved inward, and when the said slide has been properly positioned, the pin 46 will be thrust into a second perforation, it being understood that these perforations are separated definite distances, and they, therefore, act as gage means for properly positioning the slide 43 and hence the former pin or stud 33.

The pieces of work to be profiled are each denoted by 48, and they are clamped upon the upper side of the fixture or plate 28 as shown in both Figs. 5 and 6. As illustrated there are three of such pieces, and in addition to being clamped to the upper surface of the said fixture or circular plate 28 the ends of the said pieces of work also preferably engage against blocks or abutments as 49 upon the upper side of the fixture 28, which blocks or abutments as a matter of convenience are fastened to the fixture by screws. Tapped into the upper side of the fixture 28 are screws 50 which extend through longitudinal slots in the clamping members 51, springs as 52 bearing against the clamping members 51 and tending to constantly elevate said clamping member or shift the same to their inoperative positions, the clamping members when wholly open acting against the heads 53 of the screws 50. Through the tails of the clamping members 51 are tapped screws 54 equipped with levers 55 all as shown in Figs. 5 and 6, the lower ends of the screws 54 being adapted to engage projections as 56 on the upper side of the fixture 28. When the screws 54 are turned in one direction the active or inner ends of the clamping members 51 will be elevated by the coiled springs 52 whereas when said screws 54 are turned in the opposite direction the inner ends of the clamping members will be forced downward to clamp the pieces of work 48 upon the supports 57. Any other means, of course, might be utilized for clamping the work to the fixture. In the present instance the machine is adapted to profile the inner edges of the pieces of work 48, and said inner edges with the inner edges of the abutment blocks or bridging pieces 49 present a contour agreeing with the outer surface of the former 31. After one piece of work 48 has been profiled, the face plate or table 25, as will hereinafter appear, is rapidly rotated so as to bring the tool without delay into engagement with the next piece of work 48 to be profiled.

Any suitable means may be provided for operating the face plate or turn table 25. The means shown for this purpose will now be set forth. Fastened to the hollow pivot or journal portion 26 by screws or otherwise as indicated in Fig. 6 is a worm gear 58, (see also Fig. 4) said worm gear 58 being meshed by the worm 59 keyed or otherwise suitably fastened to the hollow shaft 60 (see Fig. 4). Said hollow shaft incloses the rod 61 provided at its ends with projecting pins 62 extending through longitudinal slots in said hollow shaft and connected with clutch members as 63 and 64. The clutch member 64 coöperates with the clutch member 65 at the inner end of the shaft 66 supported for rotation by the oscillatory arm 22. We might make it clear at this time that when the clutch member 63 is shifted the clutch 64 will be simultaneously shifted by the means just described, the construction being such that when the clutch member 64 engages the clutch member 65, the clutch member 63 will be out of engagement with the clutch member 67 on the stud shaft 68. This stud shaft 68 with the hollow shaft 60 and the parts connected therewith are carried by a swinging box 69 pivotally supported as at 70 by the oscillatory arm 22. It will be assumed that the shaft 66 is being rotated and that the clutch member 64 is in engagement with the member 65. In this event the hollow or tubular shaft 60 will be rotated through the clutch mechanism, by the shaft 66 thereby turning the worm 59 and through said worm rotating the worm gear 58 and consequently the turn table 25 and fixture 28. When the clutch member 64 is moved out of engagement with the clutch member 65 and when the clutch member 63 is moved into engagement with the clutch member 67 on the stud shaft 68, the said turn table and fixture will be thrown out of relation with the power-driving mechanism, although they may be turned through the action of the shaft 68 which, as will now appear, is manually operable. The shaft 68 has keyed or otherwise suitably connected therewith the spur gear 71, (see Figs. 4 and 17) in mesh with the pinion 72 to the shaft of which is rigidly connected the hand wheel 73. This construction provides, as will be understood for the rotation of the turn table or face plate 25 by hand, and it will be clear that when said turn table is being operated by power, there is no operative connection therewith of the hand wheel 73 which is particularly advantageous when the turn table is being rotated at a high speed. If the turn table were rotated at a high speed and if the hand wheel 73 or its equivalent were connected therewith, the hand wheel would be rotated at such a high speed that it might cause the breaking of an arm or leg or otherwise injure a machinist. By disconnecting the manual control from the turn table while the power feed is on, there is no danger of an attendant being injured by the wheel 73, for as will be understood, the instant the power is connected with the turn table 25 said turn table is positively and immediately disconnected from the hand wheel or equivalent part 73.

The shaft 66 is shown having fastened to its rear end the beveled gear 74 (Figs. 7 and 11) in mesh with the beveled gear 75 fastened to the lower end of the stud shaft 76 coaxial with and supported by the oscillatory arm 22. Fastened to the upper end of said stud shaft 76 is a beveled gear 77 (Figs. 7 and 11) in mesh with a beveled gear 78 rigid with the inner end of the elongated sleeve 79 loose on the shaft 80 which, as will hereinafter appear, is continuously rotative. The shaft 80 has fixed thereto at one end the step pulley 81 and at the other the spur gear 82 operatively connected by a train of change gears denoted in a general way by 83 to the shaft 84 supported like said change gears upon suitable bearings on the bed 20. The shaft 84 is provided with the bevel pinion 85 in mesh with the beveled gear 86 fastened to the lower end of the shaft 87 also supported by bearings upon said base or bed 20. Fastened to the upper end of the shaft 87 is the worm 88 in mesh with the worm gear 89 loosely supported by the sleeve 79 and provided on its outer side with a spring pawl 90 to engage the ratchet wheel 91 fastened to the sleeve 79, all as shown in Figs. 11 and 12. Splined to the shaft 80 for sliding movement thereon is a clutch member 92 coöperating with clutch teeth 93 on the inner face of the beveled gear 78. In Fig. 11 the clutch member 92 is shown as being in engagement with the teeth 93 (although this is not the normal relation) so that when power is applied to the pulley 81, the shaft 80 will be rotated to thereby rotate the gear 82 and the latter in turn through the described connections rotating the worm 88, which serves to rotate the worm gear 89 and through the pawl 90 the ratchet wheel 91 whereby the sleeve 79 will be turned to cause the gear 78 to rotate the gear 77 and through the parts already described rotate the turn table or face plate 25, this train of parts already described being in action during the slow feeding movement or while the profiling or milling operations are actually taking place.

When one piece of work is profiled, the turn table will be rapidly rotated to bring a second piece of work into positions to be operated on by a tool, and the quick feed motion is thrown into action in the present instance, by shifting the clutch 92 into engagement with the beveled gear 78, whereby the latter is practically directly driven from the shaft 80 and naturally the power of the beveled gear 78 is transferred to the turn table through the parts set forth, this movement being, as will be understood, a very quick one. During the quick feed movement the pawl 90 rides idly over the teeth of the rotating ratchet wheel 91.

The oscillatory arm 22 is provided with a bracket which supports near its center of motion the upright pin or pivot 94 (Fig. 7) and mounted for swinging movement on this pin or pivot is a sleeve 95 provided near its upper end with an arm 96 and at its lower end with a substantially similar arm 97 (Fig. 8). The arm 96 is equipped with a yoke 98 to enter a peripheral groove in the clutch 92 (Fig. 7), while the lower arm (Fig. 8) is engaged at all times by the spring plunger 99 set in a bore in the said bracket on the oscillatory arm 22, the tendency of the spring 100 of said plunger being to apply a constant effort through said plunger to the arm 97 in a direction to swing the arm 96 to carry the clutch 92 into engagement with the teeth 93, this action, however, being normally resisted by the spring latch 101 (Fig. 8) of approximately angular form, the long branch of which normally engages a catch 102 on the arm 97, the latch, however, being shown as tripped in said Fig. 8, it being assumed at this time that the clutch 92 is in engagement with the teeth 93 and thereby the beveled gear 78 will be connected practically directly to the shaft 80. The arm 97 is shown equipped with a pin 103 extending downward through a longitudinal slot in the link 104 (Fig. 8) supported above the oscillatory arm 22. There is, therefore, as will be understood, a loose connection between the link 104 and the clutch shifting device made up of a sleeve 95 and the arms 96 and 97. The link 104 is connected at its outer end with the crank arm 105, pinned or otherwise suitably connected to the lower end of the pivot 106 (Figs. 7 and 8) supported by a bracket or bearing 107 (Fig. 1) on the oscillatory arm 22. The pivot 106 is provided at its upper end with an arm 108 having a bored offset 109, and this arm 108 has pivoted to it an arm 110, the pivot of said arm 110 being coaxial with the center of motion of the arms 105 and 108. The bore of the offset 109 has a plunger 111 normally thrust outward by the spring 112

(Fig. 8). The arms 110 and 108 are adapted to be engaged by tappets such as 113 and 114 carried upon the periphery of the fixture 28, it being understood that there are several of each of these tappets. The tappets 113 in the present case serve to throw in the quick-feed mechanism, while the tappets 114 serve to throw the quick-feed mechanism out of action, the tappets 113 being adapted for such purpose to engage the arm 108, while the tappets 114 engage the yieldably backed arm 110. It will be assumed that the fixture 22 is traveling in the direction of the arrow in Fig. 8 and that the tappet 113 has engaged and swung the arm 110 outward. When said arm was swung outward by said tappet 113 the link 104 through the intermediate parts was slid inward so as to trip the latch 101 and release it from the arm 97 whereby the spring plunger 99 swung said arm 97 and therefore the arm 96 in such a direction as to carry the clutch 92 into engagement with the clutch teeth 93 so as to put the quick feed mechanism into action. When the arm 110 is swung outward the arm 108 is simultaneously swung inward so that as the fixture 28 continues to rotate the tappet 114 can engage the arm 108 and swing the same outward and therefore the arm 110 inward through the agency of the offset 109 and spring plunger 111. As the arm 108 is swung outward by the tappet 114, the link 104 through the intermediate parts is pulled outwardly, thereby drawing the arm 97 outward and consequently disengaging through the intermediate parts the clutch 92 from the teeth 93, and when the arm 97 has been returned to its initial position, it will be held positively in such position by the spring latch 101 engaging the catch 102. Owing to the fact that the arm 110 is yieldingly mounted, there is no possibility of injury resulting should two tappets simultaneously engage both arms 108 and 110. It will be seen that the outer or active ends of the arms 108 and 110 are bent inward and that they are not in the same horizontal plane, by reason of which the said arms can be properly engaged by appropriate tappets. The tappets 113 and 114 are rigidly connected with the fixture 28 and said tappets may be connected to the periphery of the fixture by bolts each designated by 115 and adapted to enter a T slot 116 (Fig. 6) in the circumference of the fixture, it being seen on reference to Fig. 8 for instance that the operative portions of the tappets 113 are above the operative portions of the tappets 114. These tappets are originally set in definite positions so that they need not be adjusted by the machinist, whereby the fixture with the forming cam 31 and said tappets as well as a throw out member, constitute a unit, so that when the device is mounted in or on the machine nothing is left to the attendant in the way of adjustment.

Just below the plunger 99 in the plane of the link 104 a spring dog or detent 117 may be provided which is only shown conventionally and which is adapted to successively enter notches each denoted by 118 in the adjacent face of the link 104 as said link is shifted so as to positively hold said link in its respective positions.

As intimated the machine is provided with means preferably connected with the fixture 28 and therefore operatively with the face plate or turn table 25, for automatically stopping the power feed of said table 25 when the last piece of work has been profiled, and although such means may vary as to character, that now to be described has been found satisfactory and involves a throw out member or knock off device as 119 fastened to the periphery of the fixture 32. Coöperative with this knock off device 119 is a rod 120 supported for vertical movement in a bore of an offset upright extension 121 of the swinging worm-shaft support 69. This rod 120 is given an initial downward movement by the throw out device 119, the final movement which is a quick one, being effected through the agency of a spring as will hereinafter appear. The rod 120 between its ends has a slot 122 (Figs. 9 and 10), the inner wall of which has straight and inclined portions 123 and 124 respectively successively engageable by the tip of a spring plunger 125, said tip normally engaging the straight face 123. The plunger 125 and its spring 126 are inclosed in a tubular extension 127 of said support 69. When the knock off device 119 strikes the upper end of the rod 120, the latter is pushed downward causing the tip of the spring plunger 125 to ride along and then out of contact with the straight face 123. As soon as the spring plunger passes off said straight face 123 it comes into contact with the inclined face 124 so that the spring 126 of the plunger serves to rapidly advance said plunger and thereby causes the same to ride along the angular face 124 thereby rapidly pressing the rod 120 downward and through the intermediate parts shifting the clutch 63 into engagement with the clutch member 67 and at the same time through the rod 61 moving the clutch 64 out of engagement with the clutch 65 to thereby stop the power feed, although the hand feed is, on this action, thrown into operative relation. The extension 121 supports for rocking motion the short shaft 128 which rocks about an axis transverse to the axis of rotation of the shaft 66 and to the outer end of said shaft 128 is pinned or otherwise suitably coneccentrically with the hub of said handle is a pin 130 (Figs. 4 and 9), the inner end of which fits a notch 131 in the rod 120. The rock shaft 128 has at its inner end an eccentric pin 132 connected with the clutch shifting fork 133 fitting a peripheral groove in the clutch member 63. It, therefore, follows that owing to the described means when the rod 120 is lowered in two successive stages as already described, the shaft 128 through the intermediate parts is rocked and through the pin 132 serves to operate the fork 133 in a direction to shift the two clutches 63 and 64 as already described to throw the power feed out of action and the hand feed into action. The power feed can of course be thrown into action by lifting up the handle 129. The swing box 69 is normally held in operative position by a spring latch 134 engaging a catch 136 on said box, said latch being pivoted to the arm 22, and being operable by the spring plunger 137 as shown in Fig. 9. By manually tripping the latch 134 the box 69 can be swung outward by hand to carry the worm 59 out of mesh with the worm gear 58 and hence permit the turn table 25 to be rotated by hand.

We provide means for compensating or taking up lost motion in the gearing which drives the turn table or face plate 25, and which lost motion may arise from a variety of causes, for instance backlash, and although said means may vary as to character a frictionally-operative device active against the turn table or some part associated therewith, meets the desired conditions, and we have for this particular purpose shown a friction brake 138 (Fig. 6) which is provided with a pendent shank or web 139 attached by screws or otherwise to the outer end of the oscillatory arm 22, said brake comprising a fixed jaw 140 and a spring-operated jaw 141 between which is situated the depending annular flange 142 of the ring fastened to the fixture 28. It will be understood that the two jaws 140 and 141 engage at all times this annular flange 142, the spring jaw 141 pressing the flange solidly against the companion jaw and the pressure of the spring or springs 144 of the jaw 141 is sufficient to effectually prevent chattering of the fixture 28 during the profiling operation.

We prefer to employ two tools, a roughing cutter as 145 and a finishing cutter as 146, see Fig. 1, said cutters being fastened to the lower ends of spindles as 147 and 148 supported by bearings upon the slide 150 movable transversely of the machine upon ways of the cross head between the uprights of standard 21 which it will be seen is of yoke or substantially U-form. The spindles 147 and 148 are longitudinally adjustable to carry the tools 145 and 146 into and out of the cutting field, and for this purpose they may be operated by levers as 151 and 152 and may be clamped in their operative positions by clamps as 153 and 154 as best shown in Fig. 1. Supported by suitable bearings on the top of the standard 21 is a main shaft 155 having a stepped cone pulley 156 at one end and a substantially similar pulley 157 at the other end, the latter being connected by a belt 158 with the stepped cone pulley 81 already described. The machine receives its power from a belt 159 connected with an overhead pulley not shown. Movable with the cross slide 150 and loose on the shaft 155 are the spiral gears 160 and 161 having extended hubs, the adjacent ends of which are provided with engaging teeth 162 so that the rotation of one will be transmitted to the other. In mesh respectively with the gears 160 and 161 are the spiral gears 163 and 164 splined or feathered to the spindles 147 and 148 respectively. During the profiling operation the gears 160 and 161 are clutched to the shaft 155, and for this purpose the clutch 165 may be provided, said clutch being splined to the shaft 155 for sliding movement thereon and in the present instance being rigid with the sleeve 166 adapted to be connected by means of a screw 167 with the hub of gear 161. The clutch 165 is shown as being in engagement with the hub of gear 161, this relation being maintained during profiling operation, although when forming a pattern as will hereinafter appear, the clutch 165 is disengaged, whereby the spindles 147 and 148 will not be operated. To throw the clutch 165 out of engagement with the hub of gear 161, the screw 167 is backed out and the clutch 165 slid along the shaft until it disengages said hub. The spindle carrying cross slide 150 is provided with a laterally extending rack bar 168 in mesh with the pinion 169 (Fig. 1) in mesh with the pinion 170 carried by the shaft of the hand wheel 171 which shaft is supported by suitable bearings on the column 21. By rotating the hand wheel 171, the cross slide 150 can through the intermediate parts be operated so as to laterally adjust the spindles 147 and 148 to bring the respective tools thereof into cutting position and when the said cross slide is set, it will be held in its adjusted position by a clamping member 172 (Fig. 1). To properly position the tools 145 and 146, stops as 173 and 174 may be provided, said stops having the usual micrometer-adjusting means and being shown as consisting of screws tapped through the blocks 175 on the crosshead of the standard 21. The cross slide 150 is shown in engagement with the stop 173, so that the tool 145 is in proper lateral position for cutting. This tool, however, is elevated and it will, therefore, be necessary to lower it by means of the hand lever 151. After the tool 145 has profiled the several pieces of work, the spindle 147 is elevated and the cross slide 150 is then moved by means of the hand wheel 171 and coöperating parts, into engagement with the stop 174 which motion brings the cutting tool 146 into proper lateral position. This tool 146 will, of course, have to be lowered by the hand lever 152, it being understood that when the respective spindles are lowered they are clamped as already set forth. It will be obvious that the bearings of both spindles are rigid with the cross slide 150 and that when the cross slide is operated both spindles move laterally therewith, although they are independently vertically adjustable.

The levers 151 and 152 to which we have referred are pivoted to the respective spindles 147 and 148 and are connected by means of links each denoted by 200 with the slide 150, they being also provided with counterbalancing weights 201 (Fig. 19). The lower portions of the spindles extend through the sleeves 202, the spindles being provided with collars 203 and 204 respectively engaging the opposite ends of the respective sleeves 202 with which we should state the clamping members 153 and 154 respectively directly coöperate to hold the spindles in their vertically adjusted positions. The bearing sleeves 202 are provided at their upper ends with rearwardly extending lugs 202' to which the rods 205 are connected, said rods extending through the bottoms of tubes 206 and being equipped with washers 207 slidable in the respective tubes, the washers being held in rigid relation with the respective rods 206 by nuts 208. Encircling the rods 205 are coiled springs 209, the lower ends of which bear against the bottom of the rods and the upper ends of which bear against the upper ends of the washers 207 so as to constantly apply an upward thrust to the rods 205 and thereby at all times tend to elevate the spindles 147 and 148. Either spindle, however, can be at once adjusted longitudinally through the manipulation of its lever 151 or 152, and when the adjustment is secured it will be maintained through the action of a clamping device 153 or 154.

We provide means whereby the speed of the tool spindles 147 and 148 can be changed without changing speed of rotation of the work table or face plate 25, and although any suitable means may be provided for obtaining this result, we find that it can be easily accomplished by the belts 158 and 159 already described acting in conjunction with a belt shifter such as 176 which consists of a manually operable rod supported for longitudinal reciprocation upon suitable bearings carried by the column 21 and shown best in Fig. 3, said belt shifter 176 being provided with belt shifting forks or fingers 177 and 178, the fork or fingers 177 coöperating with the belt 158, while the fork or fingers 178 coöperates with the belt 159. Naturally the change in speed of the spindles 147 and 148 is effected by shifting the belt 159, and it will be assumed that it is desired to increase the speed of these spindles. The belt 159 is therefore shifted from a large to a small step of the pulley 156, and when this action occurs, it will be clear that the belt 158 is moved at the same time from a large to a small step of the pulley 157 and from a small to a large step of the pulley 81, from which latter as will be recalled the turn table 25, through intermediate parts receives its motion, so that although the speed of the spindles is increased, the motion of the turn table 25 during both the normal and quick feeds remains constant. We might explain, although it is believed that it will be understood, that in the present case the pulleys 156 and 157 face in the same direction and that the pulley 81 faces in the opposite direction, although this may not always be necessary. To effectually support the oscillatory arm 22 at its outer end, said arm may be provided at its outer end with a slide or shoe 189 bolted or otherwise suitably connected to said arm and adapted to travel on the way 190 on the bed 20. (See Figs. 1 and 2.)

It is believed that the operation of the machine will be fully understood from the foregoing observations, but nevertheless it is desirable to briefly refer to the several steps of the same in somewhat definite order: It will be understood that initially the fixture 28 is clamped to the turn table or face plate 25 and that the pattern 31 is applied to the under side of said fixture 28 and that the former pin 33 or the anti-friction roll 34 thereof is in contact with the working surface of the former 31, such relation being maintained by the weight 35 which as already indicated holds the former solidly against its coöperating pin. Pieces of work such as 48 will then be placed upon the upper side of the fixture 28 with their ends against the abutments 49 as shown in Fig. 5 after which the work will be clamped in place by the clamping members 51 as already described. The cross head 150 will then be adjusted by the hand wheel 171 as already set forth so as to bring the axis of the roughing tool spindle 147 into vertical line with the contour to be followed or with the extreme inner end of one of the pieces 48 of work. After this is done, the spindle 147 will be lowered by the hand lever 151 so as to bring the roughing tool 145 into contact with the inner surface of the first piece of work. Following this the machine will be started by throwing into action the overhead pulley which is connected by the belt 156 rotates the operatively connected shafts 155 and 80 are simultaneously rotated so that the spindle 147 and therefore the tool 145 carried thereby will be rotated so that the tool can mill the contour of the work. At the same time the turn table 25 is rotated, by reason of its described connections with the shaft 80 so that the tool 145 will be caused to mill a contour in conformity with the pattern or cam 31, it being understood that the tool traverses during the profiling operation in succession the inner faces of the pieces of work 48. After one piece of work is milled, the turn table 25 is rapidly rotated as already described to bring a second piece of work under the action of the roughing cutter 145, and this operation is followed until the last piece of work is milled succeeding which the turn table operating mechanism is thrown out of action as already described by the throw out device 119. After the roughing operation has been performed the shaft 155 is stopped by unclutching the overhead pulley (not shown) and the cross slide 150 will then be moved across the machine by the hand wheel 171 until it strikes the stop 174 at which point the spindle 148 is lowered after which the operations already described are repeated in the order mentioned. When the finishing operation is performed the turn table 25 is stopped and at such time the cutter 145 is elevated, while the shaft 155 will, if desired be thrown out of action. The lubricant and chips pass through the central discharge spout 30 of the pan-like fixture 28 into a tank (not shown) inside the hollow bed 20 by way of the opening 200 in the arm 22.

We provide means as will hereinafter appear whereby work of a certain contour can be utilized for forming a pattern or former for the production subsequently of like work, and this whether the machine is to contour one or more pieces of work, and although this means may vary as to character, that now to be described has met the desired conditions, and it is best shown in Figs. 15 and 16. In the production of a former of the character already described, we place the several pieces of work together in the relation they are shown as occupying in Fig. 5 and clamp the pieces of work to the fixture 28 with the ends thereof against the abutments or blocks 49. In other words the pieces of work and the intervening blocks shown in Fig. 5 present a former for a former, and their outline is shown in Fig. 15 diagrammatically. The cutter 145 is then removed and a plain pin 180 is applied to the spindle 147 after which the spindle will be laterally adjusted if necessary by the operation of the cross slide 150 and then lowered by the lever 151 so as to bring said pin 180 into contact with the inner surface of the assembled pieces of work as shown in Fig. 15. The former pin 33 will then be removed from the bearing sleeve 40 by unloosening the screws 42 after which a support 181 for a shaft 182 will be mounted in said sleeve 40. To the lower end of said shaft a pulley as 183 will be connected, while to the upper end thereof a cutting tool as 184 will be connected. The inner surface of the assembled pieces of work should be held solidly against the former pin 180, and for this purpose the weight 35 may be utilized, although it will be necessary to shift said weight from the position it is shown as occupying in Fig. 1 to that shown in Fig. 15, and in this case the cord 36 will be passed around a pulley or sheave 185 exactly opposite the sheave 37. The pulley 182 will then be connected with a source of power as by the belt 186 passing around guide sheaves 187 on the bed 20, in order to rotate the shaft 182, and the shaft 155 being thrown into action, the turn table 25 will be rotated so as to cause the cutting tool to follow the contour of the pattern or former 188 fastened to the under side of the fixture 28.

What we claim is:

1. In a profiling machine, the combination of a carrier mounted for back and forth movement, a rotary work supporting table on said carrier, a former and a coöperating former stud both coactive to move said table, means for connecting a plurality of pieces of work with said table, profiling means active successively upon the pieces of work, on the rotation of the turn table, and mechanism for rotating the turn table and for accelerating the rotation thereof between the times at which the pieces of work are operated upon.

2. In a profiling machine, the combination of a carrier mounted for back and forth movement, a rotary work supporting table on said carrier, a former and a coöperating former stud, both coactive to move said table, a spindle, a profiling tool connected with said spindle, means for connecting several pieces of work with the work supporting table whereby as said table turns said pieces of work will be successively profiled by said tool, and mechanism for rotating the turn table and for imparting accelerated movements thereto in the times between which the pieces of work are profiled.

3. In a profiling machine, the combination of a carrier mounted for back and forth movement, a rotary work supporting table on said carrier, a former and a coöperating former stud both coactive to move said table, a cross slide, a plurality of tool carrying spindles supported for adjustment in the direction of their axis of rotation, by said cross slide, and mechanism for rotating said turn table.

4. In a profiling machine, the combination of a carrier mounted for back and forth movement, a rotary work supporting table on said carrier, a former and a coöperating former stud both coactive to move said table, mechanism for rotating said turn table, a cross slide, adjustable stops for governing the lateral positions of said cross slide, and a plurality of rotary longitudinally adjustable tool carrying spindles on said cross slide.

5. In a profiling machine, the combination of a carrier mounted for back and forth movement, a rotary work supporting table on said carrier, a former and a former stud both coactive to move said table, a cross slide, adjustable stops on the framework of the machine for determining the lateral positions of said cross slide, and a plurality of rotary longitudinally adjustable tool carrying spindles supported by said cross slide.

6. In a profiling machine, the combination of a carrier mounted for back and forth movement, a rotary work supporting table on said carrier, a former and a coöperating former stud both coactive to move said table, means for connecting a plurality of pieces of work with the turn table, and mechanism for rotating the turn table, the latter being provided with means for effecting the stoppage of rotation thereof at a predetermined point.

7. In a profiling machine, the combination of a carrier mounted for back and forth movement, a rotary work supporting table on said carrier, a former and a former stud both coactive to move said table, means for connecting a plurality of pieces of work with said turn table, profiling means to act successively on the work as the table rotates, mechanism for rotating the turn table, for moving the same at accelerated speeds in the intervals in which the pieces of work are profiled, and for also stopping the rotation of the turn table after the last piece of work is profiled, and means connected with the table for causing said accelerated movements and said stoppage.

8. In a profiling machine, the combination of an oscillatory member, the axis of oscillation of which is approximately vertical, a work supporting turn table supported by said oscillatory member at a point removed from said axis of oscillation and rotative about an axis substantially parallel with the first mentioned axis, means for supporting said oscillatory member throughout its swing, at a place under said turn table, and a former and a coöperating former stud both coactive to move said table.

9. In a profiling machine, the combination of a carrier mounted for back and forth movement, a rotary work supporting table on said carrier, a former and a coöperating former stud both coactive to move said table, means for connecting work with said table, profiling means acting upon the work on the rotation of the turn table, and mechanism for rotating said turn table and for accelerating the rotation thereof at predetermined times.

10. In a profiling machine, the combination of a carrier mounted for back and forth movement, rotary work supporting means on said carrier, means for connecting the work with the work supporting means, a rotary spindle provided with a tool to profile the work, a former and a coöperating former stud, both coactive to move the work supporting means, the diameter of the former being greater than that of the work.

In testimony whereof we affix our signatures in presence of two witnesses.

BENGT M. W. HANSON.
CARL L. GROHMANN.

Witnesses:
W. M. STORRS,
S. M. KILBOURNE.